United States Patent [19]

Barlow

[11] 4,066,007
[45] Jan. 3, 1978

[54] ACTUATOR SEAL ASSEMBLY

[75] Inventor: Roland J. Barlow, Madison Heights, Mich.

[73] Assignee: Ex-Cell-O Corporation, Troy, Mich.

[21] Appl. No.: 703,480

[22] Filed: July 8, 1976

[51] Int. Cl.² ............................ F01C 9/00; F16J 1/00
[52] U.S. Cl. ........................................ 92/125; 92/255
[58] Field of Search ................. 92/120, 121, 122, 123, 92/124, 125, 255; 91/339

[56] References Cited

U.S. PATENT DOCUMENTS

| 2,811,142 | 10/1957 | Shafer | 92/122 |
| 2,936,636 | 5/1960 | Wacht | 92/120 |
| 3,446,120 | 5/1969 | Sneen | 92/120 |
| 3,456,562 | 7/1969 | Hansen et al. | 92/125 |

Primary Examiner—Paul E. Maslousky
Attorney, Agent, or Firm—James H. Bower; Frank D. Risko

[57] ABSTRACT

A seal assembly utilizing a floating seat principle in a fluid powered rotary actuator to seal the arcuate surfaces and the planar ends of the actuator. The seal incorporates a two piece retainer design with a peripheral O-ring and cap ring combining with a captured O-ring and shoulder bolt which give the additional sealing and floating principle to assure effective sealing of the pressure chambers.

6 Claims, 4 Drawing Figures

ACTUATOR SEAL ASSEMBLY

BACKGROUND OF THE INVENTION

1. Field of the Invention

This invention relates to the field of a fluid operated rotary actuator having a particular seal arrangement.

2. DESCRIPTION OF THE PRIOR ART

Rotary actuator type devices which operate with an oscillatory motion require an unusual seal between the rotating and stationary members. The purpose of this slidable seal is to minimize leakage and improve operational efficiency of the device. Typical examples of seal configuration as shown in U.S. Pat No. 3,446,120 to Sneen. This patent shows seals between both the shaft and body of the actuator and between the mechanical stop and the body. Other examples are shown in the U.S. Pat. No. 3,426,654 to Laughman which combines an O-ring and a glide ring or cap ring of nylon or teflon to complete the sliding seal. Single piece seals are shown in U.S. Pat. No. 2,902,009 in a rotating actuator are well known and used in the art. However, only the Sneen patent shows a dual lip seal in a rotary actuator for sealing the high pressure inlet chamber from the low back pressure that is developed in such devices. There are two basic problems with the seals that have been discussed; first, the shape of the area which the seal is sealing is a rectangular section. This is especially difficult to seal at the corners or intersections of the side walls and arcuate surfaces. Second, the seals must be expandable and rub the mating surface in order to provide a seal and hence must, by necessity, be replaced when they become worn. As wear is occurring, the leadkage rate will increase because the geometry of the surfaces is not absolute and the seals have only a limited ability to move or expand to compensate for such imperfection since they are usually held in a groove or a plate affixed to the rotationg member. Seen's patent tries to reduce this effect by having a second seal in his design.

My invention overcomes these short-comings by allowing the moving seal to float so that geometric imperfections in the construction can be overcome by the ability of the seal assembly to move and fill any voids which occur in the rotation of the shaft. It is an object of this invention to provide a floating seal between the arcuate surface of a rotary actuator and the rotating element.

It is an object of this invention to provide a floating seal between the rotating element and the stationary stop in a rotary actuator.

It is an object of this invention to provide replaceable bumper stops on both the rotating member and stationary stop in a rotary actuator.

It is an object of this invention to provide a bronze or bearing type material for the seal carrier.

It is an object of this invention to provide seals in a rotary actuator so they can operate from either a liquid or a gas source.

SUMMARY OF THE INVENTION

This invention provides a static and dynamic seal in a rotary actuator by incorporating a floating design of the seal assembly itself so that out of round conditions in the rotating or stationary members of the actuator will be sealed against fluid leakage and loss of efficiency. It further provides a simple means for changing seals when they become worn or no longer functon properly and provides a replaceable bumper stop for the rotary actuator. In addition all the seal assemblies are identical for both the rotating vane and the static stop.

DESCRIPTION OF PREFERRED EMBODIMENTS

Figure 1:
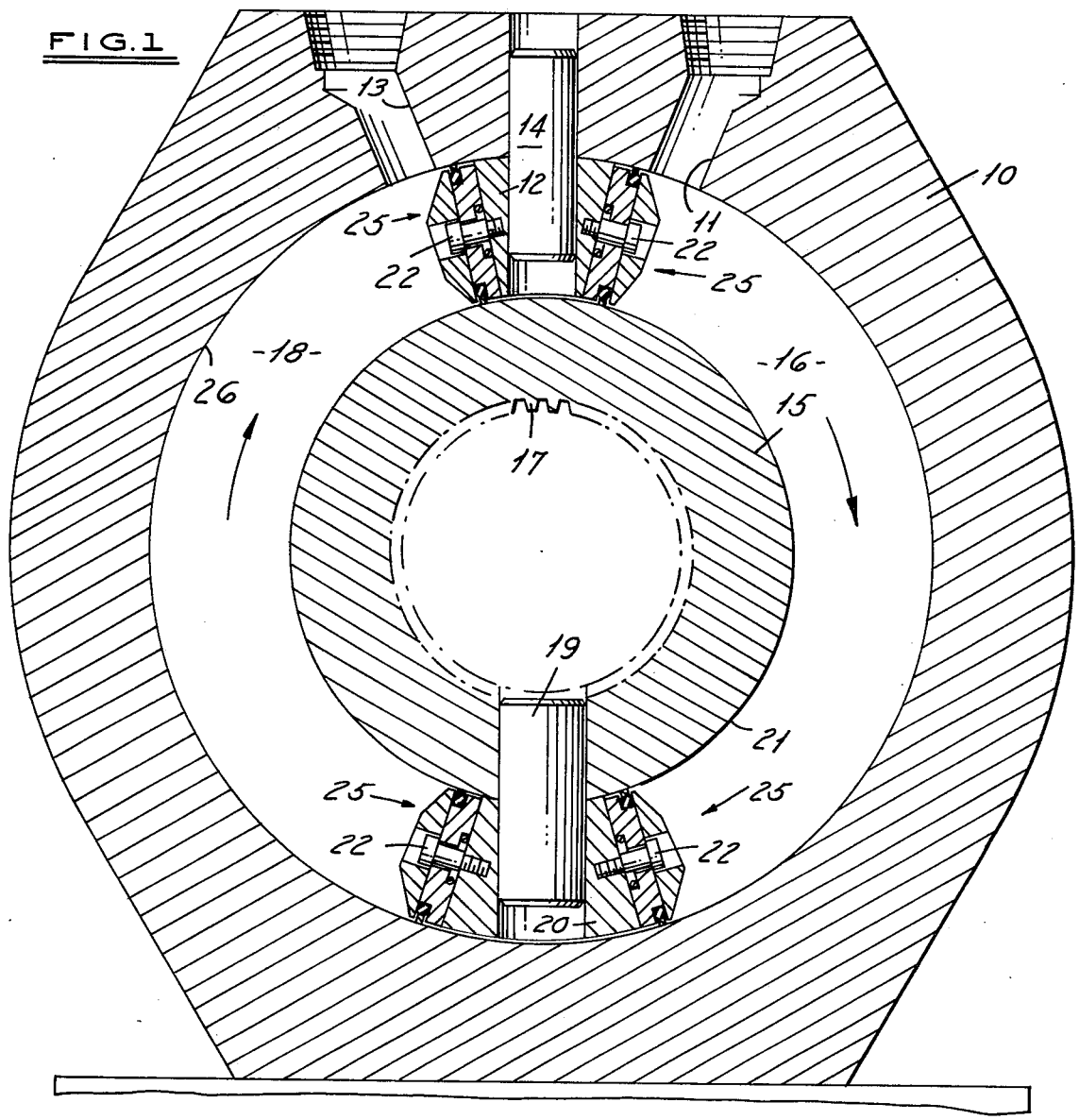
FIG. 1 is a cross sectional view of a rotary actuator showing the stationary and rotational seals.

In FIG. 1 is a cross sectional view of a rotary actuator device showing the housing 10 with the stop 12 shown pinned to the housing 10 with dowel 14. It is apparent that other forms of fasteners could be used to secure the stop 12 to the housing 10. It should be noted also that the cover plates on each side of the actuator are not shown since the method for holding the shaft bearings is well known in the art as well as the fastening of the cover plates to the housing. The hollow shaft 15 is shown here with internal splined teeth 17 in the center as the coupling point for power transmission. This shaft could have been made solid and had an external spline or some other convenient coupling method for power transmission. A dowel 19 is shown affixing the moveable vane 20 to shaft 15. The four seal assemblies 25 are shown affixed to stop 12 and vane 20 by shoulder bolt 22.

Figures 2, 3, 4:
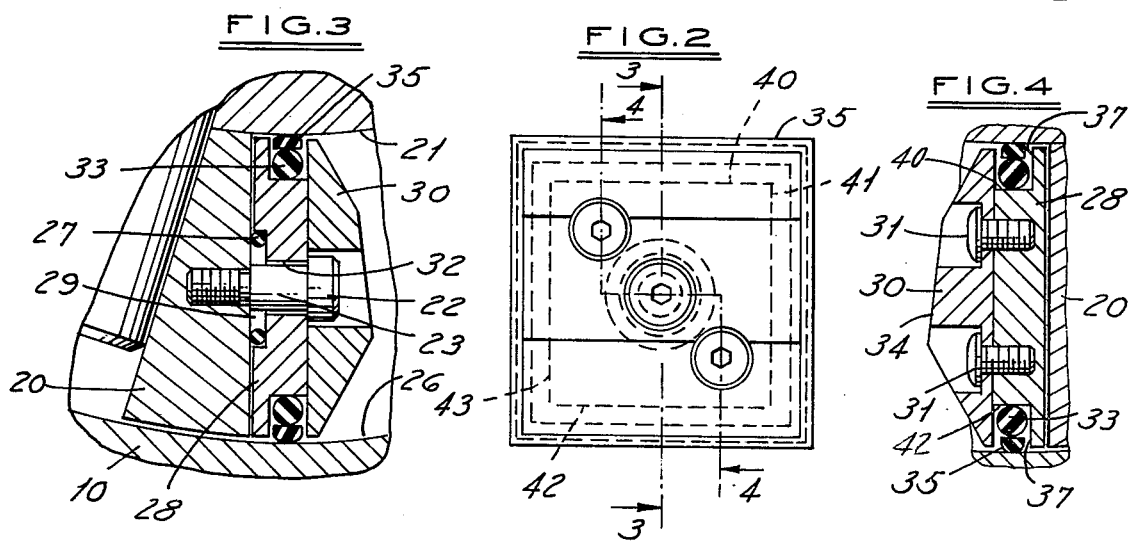
FIG. 2 is a plan view of the seal assembly.
FIG. 3 is a sectional view along line 3—3 in FIG. 2.
FIG. 4 is a sectional view along line 4—4 in FIG. 2.

The construction of seal assembly 25 can best be seen in FIGS. 2, 3 and 4 and consists of seal carrier 28 and seal retainer 30 held together by screws 31. An O-ring 27 is shown in FIG. 3 captured in counter bore 29 between seal carrier 28 and vane 20. This O-ring is also shown in FIG. 1 between carrier 28 and stop 12. O-ring 33 is a rubber-like material such as buna N, viton A or neoprene rubber, depending upon the fluid used in the actuator with the cap or glide ring 35 made from a plastic material such as, teflon or nylon material. The carrier 28 is channelled to hold these rings and consists of surface 37 and surfaces 40, 41, 42 and 43 best seen in FIGS. 2 and 4. Surface 34 of retainer 30 is angled so that a line projecting from this surface would pass through the center of shaft 15.

These rings 33 and 35 can be seen to take a square or rectangular shape as shown in FIG. 2 when they are installed in an actuator.

Best viewed in FIG. 3 it can be seen that the clearance between vane 20 and the housing 10 is sufficient so that normal runout tolerances in the shaft bearings and shaft will not cause a mechanical contact between the two elements. A similar clearance will also exist between the two cover plates and the edges of seal carrier 20. This same magnitude of clearance will exist between stop 12, shaft 15 and the cover plates. The body 23 of the round head shoulder bolt 22 is selected to be of such a length that it will be slightly longer than the thickness of seal carrier 28. The depth of counterbore 29 in conjunction with the body 23 of shoulder bolt 22 will be sufficient to keep the proper squeeze for correct sealing of O-ring 27. Bore 32 in seal carrier 28 is larger than body 23 of bolt 22 to allow radial float clearance between the body 23 and bore 32.

Ports 11 and 13 in housing 10 shown in FIG. 1 can be used for either pressure or tank connections to the fluid supply source. If pressure is applied to port 11 the vane will move in a direction of the arrows shown in chamber 16 and 18.

The nature of the construction of the rotary actuator is to allow easier machining and finishing of the housing 10. With a dowel 14 pressed into the stop 12 to hold it in place in housing 10, the assembled actuator is inexpensive to manufacture and uncomplicated. However, sealing from the pressure to the tank side of the unit has always been a problem. The close manufacturing tolerances on unusually shaped parts made the fits and clearances all the more troublesome. My invention of a double floating seal reduces the problem tremendously.

OPERATION best viewed in FIGS. 1 and 3 it can be seen that if fluid is ported into port 11 with port 13 connected to tank, the vane 20 would attempt to move in a clockwise direction as shown by the arrows. Since pressure is now exerted in chamber 16, fluid will attempt to leak past all the seals to the lowest pressure level. The clearance on seal retainer 30 can be seen to easily allow fluid past its edge to encounter O-ring 33 and glide ring 35. The fluid pressure would push and distort the O-ring 33 and glide ring 35 against the shaft surface 21, the side or cover plates of the actuator and against the arcuate surface or bore 26 of the housing. The contact against the shaft surface 21 would be essentially a static seal whereas contact against the covers and the housing bore 26 would be a dynamic seal. The fluid pressure would find a path past the shoulder bolt 22, past the body 23 and bore 32 into the counter bore 29 causing the O-ring 27 to deform against the vane 20 on the shaft 15 or the stop 12 affixed to the housing 10. However, the length of the body 23 of bolt 22 and the bore 32 in seal carrier 28 allows the seal assembly 25 to float in a transverse plane relative to shoulder bolt 22 and center itself so that the seal can seek the best position and can conform to surface anomalies and prevent the seal from getting distorted or hung-up and causing loss of fluid from the input to the tank side of the actuator. This seal arrangement is designed as a uni-directional device. Fluid pressure is always applied on that side of the seal assembly where the head of the shoulder bolt appears. The opposite side of the seal assembly, where O-ring 27 is seated, is always at a lower pressure. This results in the sealing elements always being loaded toward the bronze seal carrier 28. Bronze is used here for the seal carrier to prevent galling and scoring of the actuators arcuate and planar surfaces since they can contact these surfaces. However, some other similar bearing-like material could be used in lieu of bronze. The carrier 28 is closely toleranced to the vane 20 and the stop 12 to prevent seal extrusion but the seal retainer 30 is not closely toleranced and is in reality rather loosely toleranced since it is primarily a seal retainer and an impact plate. Surfaces 34 of each seal assembly 25 will close in parallel contact with each other thus forming a mechanical stop which exhibits large contact areas and subsequent low stress.

Other changes might be made in the embodiment herein described without departing from the spirit of my invention. It is understood that such changes would fall within the scope of the appended claims.

Having thus disclosed my invention, I claim

1. In a rotary actuator device consisting of a housing with internal arcuate surfaces, cover plates affixed to said housing, an actuator stop means and an actuator shaft and vane means having a seal means comprising a seal carrier means shaped to closely fit between said cover plates and between said actuator shaft and arcuate surface of said housing;
    a first O-ring and glide ring located in a channel on said seal carrier means with a seal retainer fixedly held on one side of said carrier means
    a second O-ring captively retained in a counterbore in said seal carrier means on a remaining opposite side of said carrier means; and
    a holding means affixing said seal means to one side of said actuator vane said actuator stop means also including a seal means.

2. The rotary actuator device of claim 1 wherein said holding means is a shoulder bolt wherein a body of said bolt is slightly longer than the thickness of said seal carrier means.

3. The rotary actuator device of claim 2 wherein said vane seal means is removably affixed to said side of said actuator vane and the actuator stop seal means is removably affixed to one side of said actuator stop means.

4. In a rotary actuator device as in claim 1 wherein the actuator stop seal means comprises: a seal carrier means shaped to closely fit between said cover plates and between said actuator shaft and arcuate surface of said housing; a first O-ring and glide ring located in a channel on said seal carrier means with a seal retainer fixedly held on one side of said carrier means; a second O-ring captively retained in a counterbore in said seal carrier means on a remaining opposite side of said carrier means, and a holding means removably affixing said seal means to one side of said actuator stop means.

5. The rotary actuator device of claim 4 wherein said holding means is a shoulder bolt wherein the body of said bolt is slightly longer than thickness of said seal carrier means.

6. The rotary actuator device of claim 5 wherein an identical actuator stop seal means is removably affixed on a remaining opposite side of said actuator stop means.

* * * * *